March 30, 1926.
H. W. JOY
1,578,894
FILM REEL FOR MOTION PICTURE PROJECTING APPARATUS
Original Filed Feb. 5, 1924
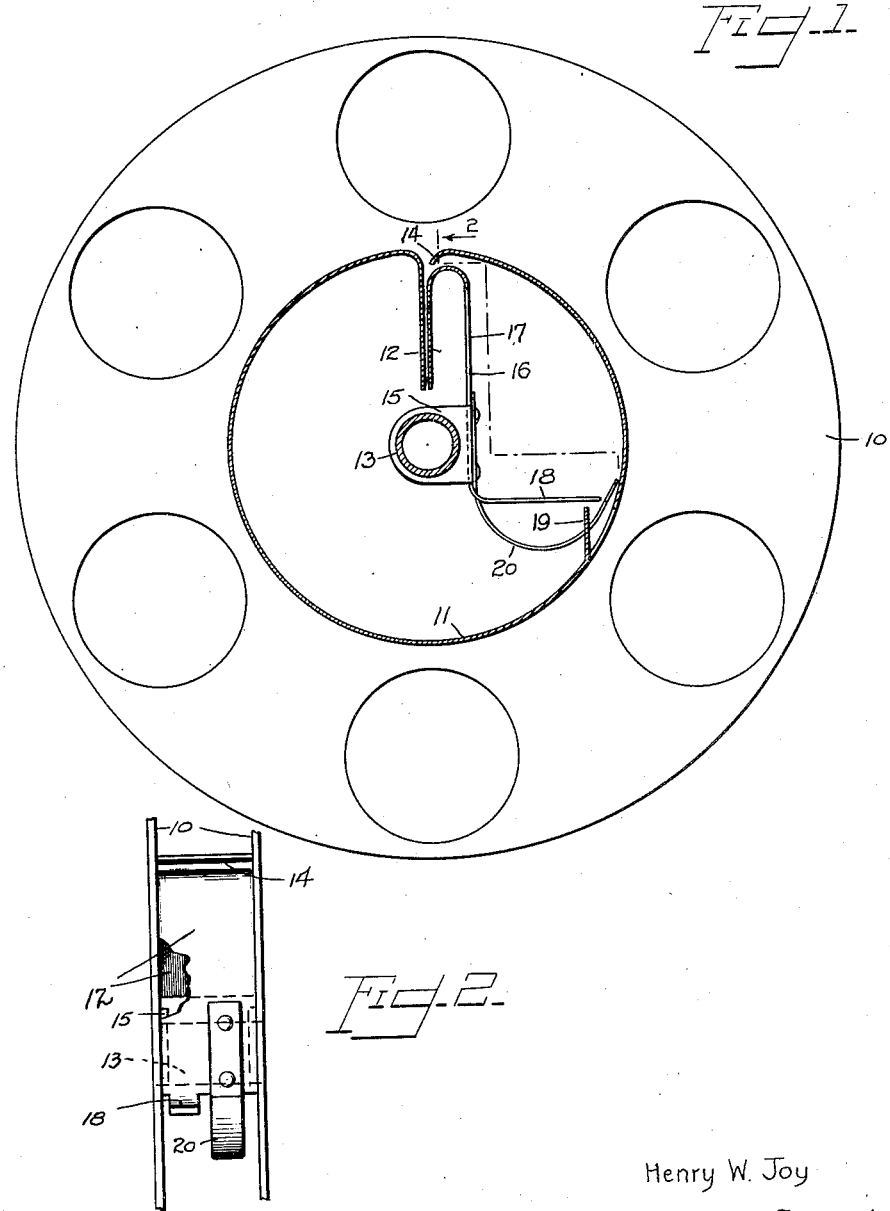
Henry W. Joy
Inventor
By his Attorney Patented Mar. 30, 1926.

1,578,894

UNITED STATES PATENT OFFICE.

HENRY W. JOY, OF CRUGERS-ON-HUDSON, NEW YORK.

FILM REEL FOR MOTION-PICTURE-PROJECTING APPARATUS.

Original application filed February 5, 1924, Serial No. 690,706. Divided and this application filed November 12, 1924. Serial No. 749,391.

*To all whom it may concern:*

Be it known that I, HENRY W. JOY, a subject of the King of Great Britain, residing at Crugers-on-Hudson, Westchester County, State of New York, have invented new and useful Improvements in Film Reels for Motion-Picture-Projecting Apparatus, of which the following is a specification.

This invention relates generally to portable motion picture projecting apparatus, and has specific reference to certain improvements in the construction of film reels, the present invention being to matter divided out of my application for Letters Patent of the United States, filed February 5, 1924, Ser. No. 690,706, and the object thereof is to provide a film reel with means for receiving, holding and automatically releasing the end of a film.

My invention is illustratively exemplified in the accompanying drawings in which Figure 1 is a transverse sectional view of my improved reel showing the film holding and releasing means; and Figure 2 is a detail sectional view of the film gripping means as applied to the core of the reel, the view being taken on lines 2—2 of Figure 1.

Referring to the drawing, 10 denotes the parallel circular discs or flanges which are preferably perforated for the purpose of reducing the weight. An annular member or core 11 separates the two discs 10 and comprises a curved piece of sheet metal having an inward radial projection 12 extending to a point short of the hub 13 of the reel proper. The opposite end of the curved piece of metal approaches the upper portion of the radial projection 12 to a point just short of making contact and is curved slightly inwardly to provide a lip 14. The end of the film is inserted in the opening between the parts 12 and 14 and is then engaged by a gripping device, comprising a pair of ears 15 with openings to receive the hub 13, said ears 15 being internal parts of an angular plate 16 having a straight portion 17 disposed parallel to the projection 12, and a finger plate 18 projecting at right angles to the plane of the straight portion. The end of the finger plate 18 projects to a point short of the inner periphery of the core 11 and at an elevation just over the stop lip 19 which is bent inwardly from the core. The other end of the portion 17 is bent over one half a complete circle and the free end projects inwardly and radially and is disposed closely adjacent the projection 12. A curved spring 20 is attached at one end to the portion 107 and at the other end it yieldably engages against the inner periphery of the core.

To attach a strip of film to the reel, the end of the strip is inserted between the projection 12 and adjacent surface of the part 17 which is yieldably held against the film by the spring 20. As the reel is rotated in the usual manner the film coils about the core 11, the frictional engagement of the two parts 12 and 17 being sufficient to prevent the interposed film from escaping. When the film is being unwound from one reel and the last coil is reached, there is a point at which the radius described by the engaged end of the film will coincide with a line tangent to the periphery of the film on the other reel in the device whereupon the end of the film will be readily released from the first reel.

What I claim is:—

1. A reel for motion picture film, comprising a slotted core having a radially disposed wall on one edge of said slot and an inwardly curved lip on the other edge, and means for yieldably engaging the film against the said wall, said means comprising a loosely mounted member having a wall disposed parallel to said radial wall in the core, and a spring carried by the member and engaged with the core to yieldably press the wall of the member in the direction of the wall of the core.

2. A reel for motion picture film, comprising a core bent to form an annular member and having one end disposed radially towards the center of the reel and the other end curved inwardly slightly to provide a lip, said lip being in a position short of contacting with the radial portion, a thimble disposed centrally of said reel, and a spring pressed film clamping member loosely disposed on said thimble and having a straight portion terminating in a bent over end portion disposed closely adjacent and parallel to said radial portion of the core, the opposite end of the straight portion thereof being bent at an angle to the plane of the said portion, an inwardly turned lip cut from the curved wall of the core and disposed in the path of possible movement of the said bent portion in a direction to cause the parallel portion to separate, and a spring fixed at one end to the straight portion and contacting at the other end against the wall of the core to normally hold the bent over portion in frictional engagement with the surface of the interposed film.

In testimony whereof I affix my signature.

HENRY W. JOY.